Figure 1:
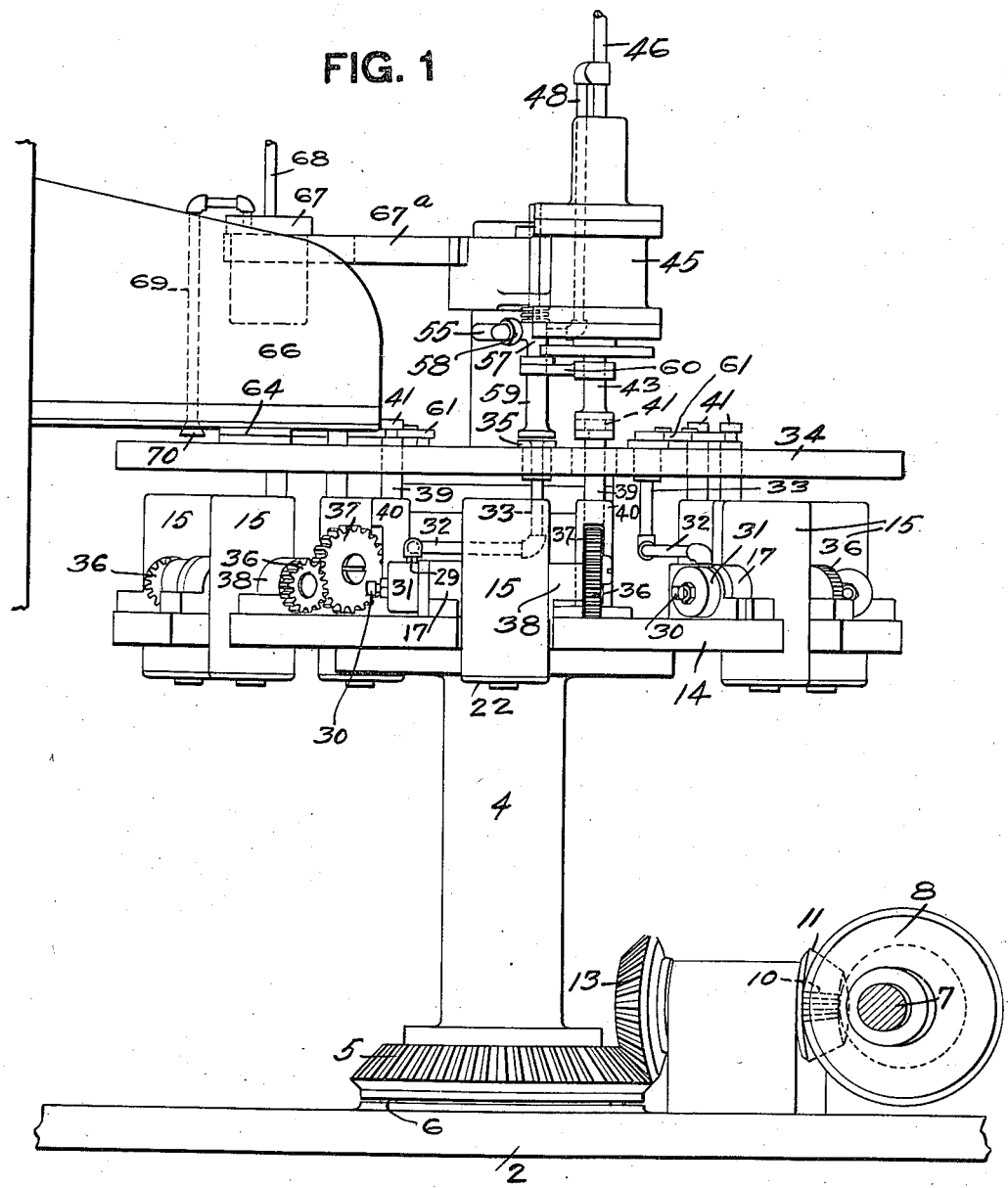

L. W. PROEGER.
APPARATUS FOR DELIVERING GLASS TO RECEPTACLES.
APPLICATION FILED MAR. 6, 1911.
1,178,678.
Patented Apr. 11, 1916.
4 SHEETS—SHEET 2.
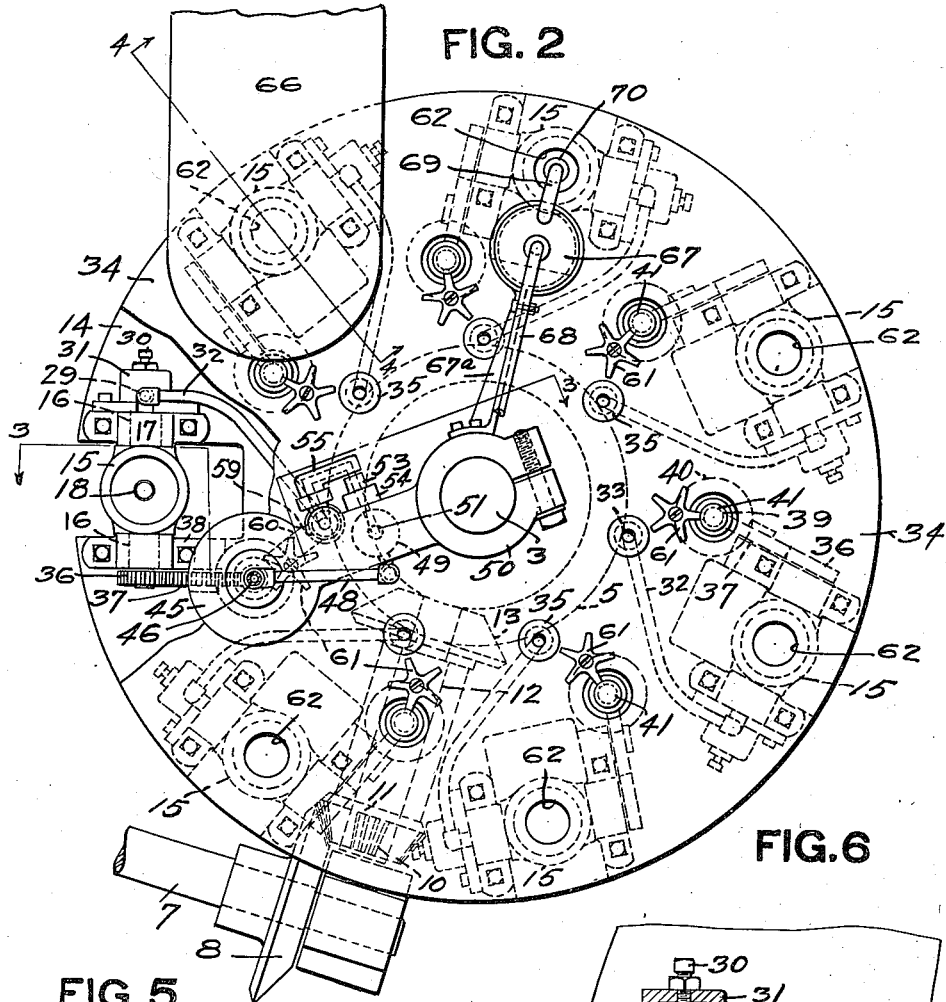
FIG. 2
FIG. 6
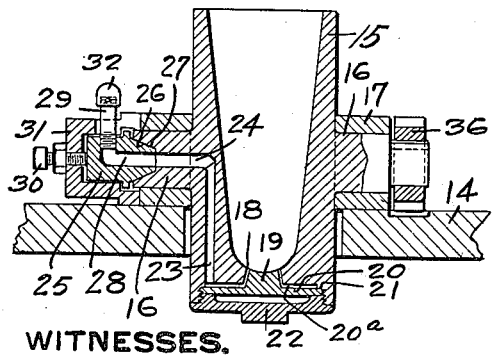
FIG. 5
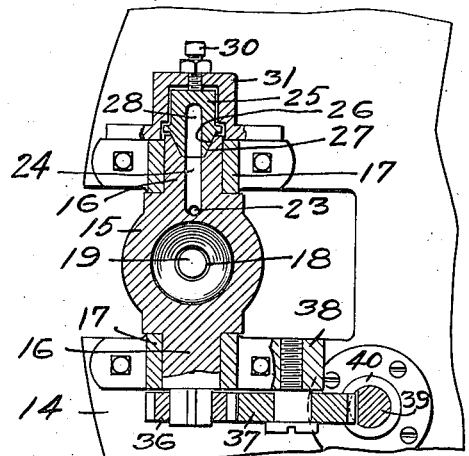
WITNESSES.
J. R. Keller
Robert C. Totten
INVENTOR.
Luis W. Proeger
By Kay & Totten
Attorneys L. W. PROEGER.
APPARATUS FOR DELIVERING GLASS TO RECEPTACLES.
APPLICATION FILED MAR. 6, 1911.
1,178,678.
Patented Apr. 11, 1916.
4 SHEETS—SHEET 3.
FIG. 4 FIG. 3
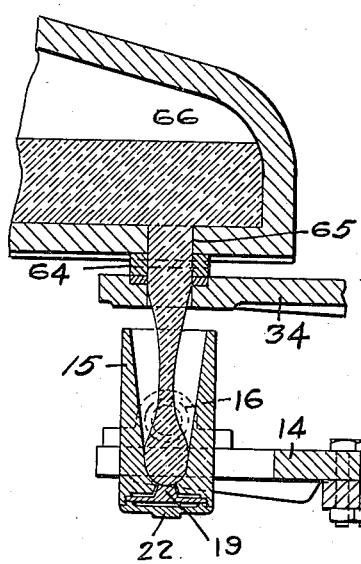
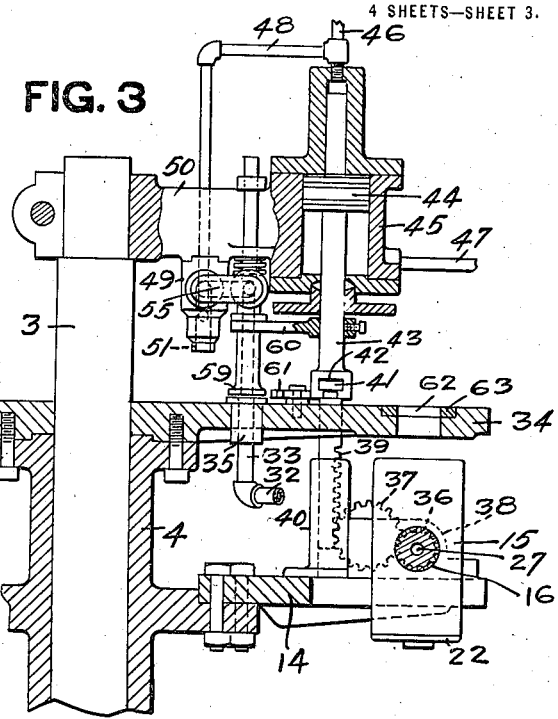
FIG. 7
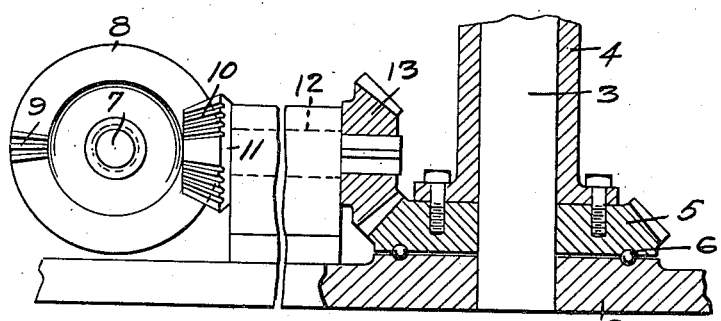
FIG. 8
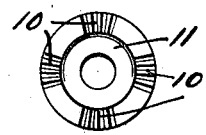
FIG. 9
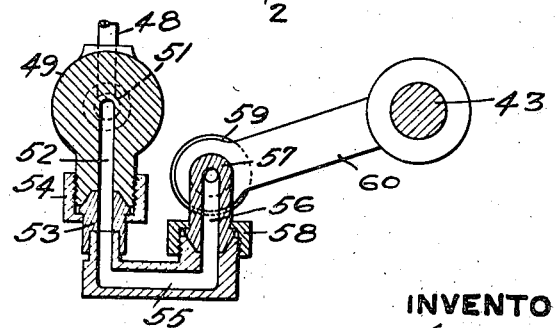
WITNESSES.
J. R. Keller
Robert C. Totten
INVENTOR.
Luis W. Proeger
By Kay & Totten
Attorneys L. W. PROEGER.
APPARATUS FOR DELIVERING GLASS TO RECEPTACLES.
APPLICATION FILED MAR. 6, 1911.

1,178,678.

Patented Apr. 11, 1916.
4 SHEETS—SHEET 4.

WITNESSES.

INVENTOR.

UNITED STATES PATENT OFFICE.

LUIS W. PROEGER, OF PITTSBURGH, PENNSYLVANIA, ASSIGNOR OF ONE-HALF TO CHARLES N. BRADY, OF WASHINGTON, PENNSYLVANIA.

APPARATUS FOR DELIVERING GLASS TO RECEPTACLES.

1,178,678.

Specification of Letters Patent.   Patented Apr. 11, 1916.

Application filed March 6, 1911. Serial No. 612,563.

*To all whom it may concern:*

Be it known that I, LUIS W. PROEGER, a citizen of the United States, and resident of Pittsburgh, in the county of Allegheny and State of Pennsylvania, have invented a new and useful Improvement in Apparatus for Delivering Glass to Receptacles; and I do hereby declare the following to be a full, clear, and exact description thereof.

My invention relates to apparatus for delivering molten glass to receptacles.

The object of my invention is to provide a simple and efficient form of apparatus by means of which the molten glass in a furnace or other receptacle may be delivered directly to a mold or other receptacle in measured quantities, the full amount of glass required being delivered directly from the furnace to the mold or other receptacle, so that all the glass delivered to the mold is at the same temperature and no chilling of a portion of the glass has been allowed to take place before the glass is delivered to the mold or other receptacle. This requires the cutting off of the stream of glass flowing to the mold or other receptacle from time to time as the receptacle passes to another position and the empty receptacle is brought up into position to be filled.

A further object of my invention in this connection is to provide for the cutting off by a quick movement of the flowing glass so that practically all of the time the machine is in operation, the glass is flowing directly from the furnace into the mold or other receptacle, and the time the flow is cut off is reduced to a minimum.

A further object of my invention is to provide for the introduction into the mold or other receptacle of a substance which will act to insulate the molten glass from direct contact with the walls of the mold to reduce the chilling effect of the mold on the glass during the pouring of the glass into the mold.

To these ends my invention comprises the novel features hereinafter set forth and claimed.

Figure 10:
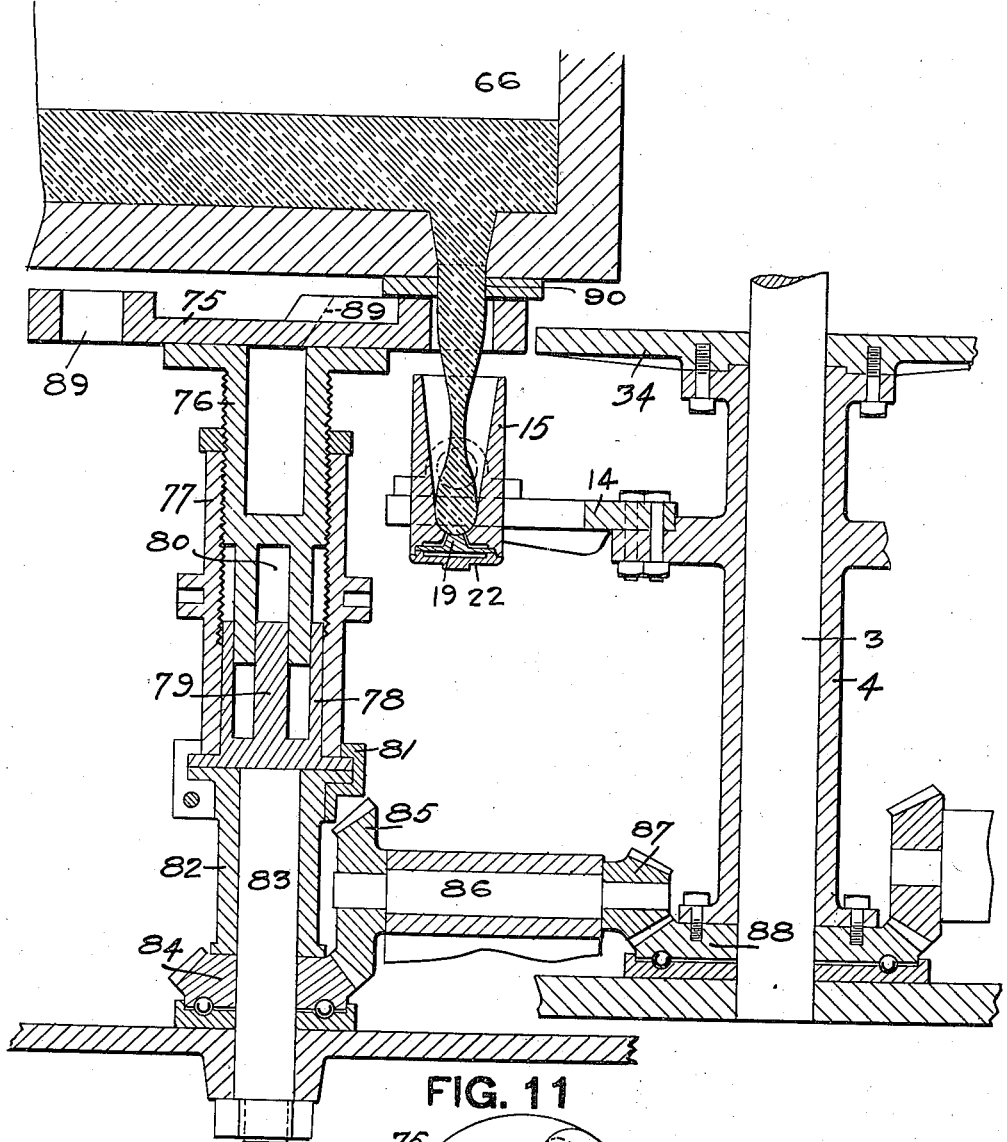
Figure 11:
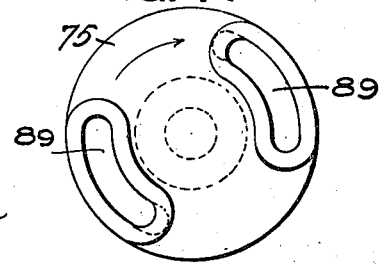

In the accompanying drawings, Figure 1 is a side elevation of my improved apparatus; Fig. 2 is a plan view; Fig. 3 is a section on the line 3—3 Fig. 2; Fig. 4 is a section on the line 4—4 Fig. 2; Figs. 5 and 6 are enlarged details of the receptacle for receiving the glass; Figs. 7 and 8 are details of the driving mechanism and Fig. 9 is an enlarged detail of a pipe connection to create the vacuum in the receptacle. Figs. 10 and 11 are modified forms of my invention.

In the drawings the numeral 2 designates a suitable base or platform for the apparatus, and stepped in said base or platform is the shaft or column 3. The sleeve 4 surrounds the column 3 and secured to said sleeve is the bevel-gear 5. The bevel-gear 5 rotates on the ball-bearing 6 in the base 2. The power-shaft 7 driven by a motor or any other suitable engine has the bevel-wheel 8 with a segmental gear or teeth 9. The teeth 9 of the wheel 8 are adapted to engage the teeth 10 of the bevel-gear 11 mounted on the shaft 12. A bevel-pinion 13 on the shaft 12 meshes with the bevel-gear 5 on the sleeve 4. In this manner as more fully hereinafter set forth, an intermittent rotary movement is imparted to the sleeve 4.

Bolted or otherwise secured to the sleeve 4 is the table 14. This table carries the receptacles or cups 15 which are to receive the molten glass and while I have illustrated these cups or receptacles as merely temporary holders for the glass and from which the glass is delivered to the mold, yet I wish it to be understood that I do not limit my invention to receptacles of this character as the molds themselves in which the article is to be formed may be carried directly by the table 14 and the molten glass delivered directly to said molds.

The cups 15 are provided with the trunnions 16 which fit within the bearings 17 carried by the table 14, as clearly shown in Fig. 5. This permits the cups 15 to be tilted so as to discharge the molten glass therefrom at the proper time and in order to retain the molten glass within the cups during the tilting of same I provide for holding the glass within the cups by means of suction and for this purpose the cups are constructed in the following manner: An opening 18 is formed at the inner end of the cup and said opening is partially closed by the plug 19 carried by the plate 20. This plate 20 engages the shoulders 21 formed in the cup and the plate is thus held at the proper distance to form a passageway 20ª between the plug 19 and the walls of the opening 18. The plate 20 is held in place by the cap 22 which is screwed into the cup. An air-passage 23 is formed in the body of the cup and said passage communicates with the interior of the cup in the manner described through passage 20ª. This passage 23 communicates with the passage 24 in the trunnion 16. A bearing block 25 has the tapering portion 26 which is ground to fit a correspondingly shaped recess 27 in the trunnion and forms a bearing for the trunnion on that side. A ground joint is provided between the tapering portion 26 of the bearing-block 25 and the trunnion so as to provide against the escape of the air. The bearing-block 25 is provided with the passage 28 and a pipe 29 is threaded into said block to contact with the passage 28. The block 28 is held against rotation by the set-screw 30 which passes through the cap 31 which incloses the said bearing-block. A pipe 32 is connected up with the pipe 29 and said pipe 32 in turn is connected to the vertical pipe 33 which extends up through the cut-off plate 34. The bushing 35 extending down through the cut-off plate 34 receives the upper end of the pipe 33.

Secured to one of the trunnions 16 of the cup 15 is the pinion 36 which is engaged by the pinion 37 journaled in the bearing 38. This pinion 37 is engaged by the rack-bar 39 which is adapted to move in the guide 40. It is apparent that by the vertical movement of the rack-bar 39 the cup 15 will be rotated on its trunnions as will be more fully hereinafter set forth, and I will now describe the mechanism by which this is accomplished. The upper end of the rack-bar 39 has the head 41 and during the rotation of the table 14 the head 41 of the rack-bar is adapted to come into engagement with the recess 42 formed in the lower end of the piston-rod 43. This piston-rod 43 has the piston 44 which operates in the cylinder 45. The air or other motive fluid operating the piston 44 is supplied by the pipes 46 and 47. It is apparent that when the piston 44 is operated to move the rack-bar 39 to invert the cup 15, it will be necessary to apply the suction to the inner end of the cup to retain the glass in the cup during the tilting operation and this is effected in the following manner: The pipe 48 connects with the pipe 46, and at its opposite end said pipe connects with the sleeve 49 carried by the bracket 50 which supports the cylinder 45. The sleeve 49 has the outlet 51 and a by-pass 52 in said sleeve communicates with the bushing 53 which is held in place by the collar 54. A coupling 55 connects the bushing 53 with the passage 56 in the thimble 57 by means of the connecting collar 58. A mouth piece 59 is connected with the thimble 57 supported by the arm 60 secured to the piston-rod 43. This mouth-piece 59 is adapted to coincide with and engage the bushing 35 in the cut-off plate 34.

Mounted at intervals on the cut-off plate 34 are the star-wheels 61 which are adapted normally to engage the head of the rack-bar 39 so as to hold said rack-bar up in position to be engaged by the piston-rod 43. As the cut-off plate moves around in position to bring the head 41 of the rack-bar into engagement with the piston-rod, said piston-rod will act to move the star-wheel so that the tooth of said wheel engaging the head 41 of the rack-bar will be moved out of the way and the further movement of the cut-off plate will act to bring another tooth of the star-wheel 61 into engagement with the head of the rack-bar and support the same after it has passed out of engagement with the piston-rod.

The cut-off plate 34 is bolted or otherwise secured to the sleeve 4 and moves with the table 14. This cut-off plate is provided with the openings 62 corresponding in number to the cups 15, and in line with said cups. Rings 63 surround the openings 62 and are countersunk in the cut-off plate. A plate 64 surrounds the opening 65 in the bottom of the chamber 66 which contains the molten glass. This chamber 66 may be in direct connection with the furnace containing the molten glass so that the glass flows from the furnace into the chamber 66 to be drawn off therefrom in the manner hereinafter set forth. Any suitable receptacle, however for the molten glass may be employed and the glass maintained in the proper position for flowing in any suitable manner.

Before the cups or molds come around in position to receive the molten glass, I provide for the spraying of the interior walls of said cups with some substance which will act to insulate the molten glass from the walls of the mold and so reduce the chilling effect of the walls of the mold on the glass during the time that the glass is being poured into the cup. Accordingly I provide the reservoir 67 which is carried by an arm 67ª from the column 3 and said reservoir contains the fluid which I employ for this purpose and said fluid may consist of a suitable oil, soap water or any other substance which may be found adapted for the purpose. A pipe 68 enters the upper end of the reservoir 66 and by means of air pressure admitted by the pipe 68, the fluid in the reservoir 66 is forced up and down through the pipe 69 to the spraying nozzle 70 where the fluid is sprayed into the cup standing in position below the nozzle. The fluid will be directed onto the inner walls of the cup and when the cup passes to the position beneath the pouring opening of the furnace, the molten glass in filling said cup will be insulated from the walls of the cup to a certain extent by the vapor formed by the heat of the glass and the oil or other substance so as to prevent the sudden chilling of the glass and the ill effects which result therefrom.

In the operation of my improved apparatus the cups are moved around successively into position to receive the molten glass which is discharged directly from the furnace or other receptacle, through the opening 62 in the cut-off plate into the cup, as clearly indicated in Fig. 4. The cup having been previously sprayed with the fluid from the reservoir 66, the molten glass as it rises within the cup is insulated from the chilling effect of the walls of the cup for the time being, and as the glass flows directly from the opening in the furnace all the glass admitted to the cup is admitted at the same temperature so that the glass first introduced into the mold does not differ in consistency from that delivered later, and as a consequence is uniform in character, and that flowing in later simply falls upon a mass of like consistency and temperature. This introduction of the glass in this way prevents the formation of cords or streaks in the finished article. When the proper amount of glass has been introduced to the cup 15, the parts of the mechanism having been timed to operate at determined periods, the teeth 9 of the bevel-wheel 8 will engage with the teeth 10 of the bevel-gear 11 and a quick rotary motion will be imparted to the sleeve 4 and to the table 14 and cut-off plate 34. The cut-off plate will consequently move and in doing so the imperforate portion between the openings 62 will come in contact with the ring 64 around the opening 65 and consequently the flow of glass will be cut off until the next opening 62 in the cut-off plate is brought into coincidence with the plate and another cup 15 brought into like position, whereupon the teeth 9 will have passed from engagement with the teeth of the bevel-gear 11 and the cut-off plate and table 14 will be brought to a standstill. The glass immediately begins to flow again into the cup 15.

The glass first introduced into the cup comes directly from the molten glass in the furnace so that there is practically no chilled glass introduced to the cup which has been held back during the cessation of the flow of the glass. As a consequence, as stated above, the glass first introduced into the cup is of the same consistency as that which flows later into the cup and as a consequence, there is no liability of the imperfections in the finished ware which result from glass of unequal temperatures being admitted to the mold. At the time that the rotation of the table 14 and cut-off plate 34 takes place, a cup is brought around into position with reference to the mold into which the molten glass is to be discharged and this brings the head 41 of the rack-bar into engagement with the piston rod 43. The air is admitted to operate the piston 44 and at the same time that the air is admitted by the pipe 46 for this purpose the air also passes down through the pipe 48 and through the sleeve 49 to the outlet 51. This admission of the air by the pipe 46 not only acts to lower the piston 44 and the rack bar 39 to tilt the cup 15 on its trunnions, but at the same time the passage of the air through the pipe 48 and outlet of the sleeve 49 causes a suction in the pipe mouth piece 59 through the connections hereinbefore described and as this mouth piece 59 is directly over the bushing 35, a like suction will be created in the pipe 32. The connections of the pipe 32 with the passage 23 in the cup will cause the suction at the inner end of the cup 14 and this suction will act to hold the glass within the cup during the tilting of the same. When the tilting operation has been accomplished and the piston 44 is operated in the opposite direction the suction will be destroyed, and the contents of the cup will be discharged into the mold to be formed by said mold into any suitable article.

In Figs. 10 and 11 I have illustrated a modified form of my invention in which the cut-off plate 75 is not carried by the same rotary frame as the receptacles for the glass. The cut-off plate 75 is carried by the threaded member 76 which engages the sleeve 77. A bushing 78 has a web 79 which engages the recess 80 in the member 76. A collar 81 unites the bushing and a sleeve 82 on the stationary shaft 83. A bevel-gear 84 on sleeve 82 is engaged by bevel-gear 85 on shaft 86. A bevel-gear 87 is engaged by the bevel-gear 88. A quick rotary motion is thus given to the cut-off plate 75. The cut-off plate may be adjusted at different heights by turning the sleeve 77. Openings 89 are formed in the plate which are brought into coincidence into the outlet 90 of the furnace. The openings 89 are larger than the outlet and so prevent contact of the glass with the sides of said openings and so reduce the chance of the chilling of the glass. The openings 89 are elongated so that the glass is permitted to flow through said openings before the cup 15 is brought into position to receive the glass. Before however the glass has had time to drop to a point below the upper edge of the cup said cup will have moved into position to catch and receive the glass.

Instead of the cut-off plate, I employ the method of cutting off the glass described and claimed in an application filed by me on the 30th day of August, 1909, Serial No. 515,271, where the cut-off is obtained by means of a suction device and in that case, as in the present, the glass is cut off and held directly in the furnace or receptacle containing the molten glass so that when the vacuum is destroyed and the glass allowed to flow the glass comes directly from the furnace into the mold or cup and has not been subjected to any chilling effect.

What I claim is:

1. In apparatus for delivering molten glass to receptacles, the combination of a suitable rotary support, means for imparting intermittent movement to said support, a tilting receptacle on said rotary support, a vertically movable rack-bar on said rotary support, connections between said rack-bar and said tilting receptacle, a fluid operated piston on a stationary support, a piston-rod in the path of said rack bar and adapted to engage said rack-bar temporarily, and means for supporting said rack-bar.

2. In apparatus for delivering molten glass to receptacles, the combination of a suitable rotary support, means for imparting an intermittent movement to said support, a receptacle on said support, a vertically movable rack-bar, connections between said rack-bar and said tilting receptacle, a fluid operated piston, a piston-rod in the path of said rack bar and adapted to be engaged by said rack-bar temporarily, a support adapted to support said rack-bar when disengaged from said piston-rod and means for throwing said support into and out of operation by said piston-rod.

3. In apparatus for delivering molten glass to receptacles, the combination of a suitable rotary support, means for imparting an intermittent movement to said support, a receptacle on said support, a vertically movable rack-bar, connections between said rack-bar and said tilting receptacle, a fluid operated piston, a piston-rod in the path of said rack-bar and adapted to be engaged by said rack-bar temporarily, a star-wheel adapted to support said rack-bar when disengaged from said piston-rod, and means for throwing said star-wheel into and out of operation by said piston-rod.

4. In apparatus for delivering molten glass to receptacles, the combination of an intermittently operated rotary carrier, tiltable receptacles on said carrier, a reservoir containing molten glass having an outlet adapted to deliver to one of said receptacles when said carrier is at rest, a cut-off plate on said carrier, a pipe carried by said cut-off plate, connections between said pipe and an orifice at the inner end of said receptacle, a stationary suction device adapted to coincide with said pipe when the carrier is at rest at a station other than the filling station to create a suction to hold the glass within said receptacle during the tilting operation.

In testimony whereof I, the said LUIS W. PROEGER, have hereunto set my hand.

LUIS W. PROEGER.

Witnesses:
ROBT. D. TOTTEN,
JOHN F. WILL.